United States Patent [19]
Sarangapani

[11] Patent Number: 6,055,042
[45] Date of Patent: *Apr. 25, 2000

[54] METHOD AND APPARATUS FOR DETECTING OBSTACLES USING MULTIPLE SENSORS FOR RANGE SELECTIVE DETECTION

[75] Inventor: Jagannathan Sarangapani, Peoria, Ill.

[73] Assignee: Caterpillar Inc., Peoria, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,495

[22] Filed: Dec. 16, 1997

[51] Int. Cl.$^7$ .............. G01C 3/08; B60T 7/16; B25J 19/00
[52] U.S. Cl. .............. 356/4.01; 180/167; 180/169; 342/71; 367/96; 901/46
[58] Field of Search .............. 901/46, 47; 180/167–169; 356/4.01, 5.01; 172/5; 342/71; 367/96

[56] References Cited

U.S. PATENT DOCUMENTS

| | | | |
|---|---|---|---|
| 4,477,184 | 10/1984 | Endo | 180/169 |
| 4,638,445 | 1/1987 | Mattaboni | 180/168 |
| 5,087,918 | 2/1992 | May et al. | 342/85 |
| 5,122,796 | 6/1992 | Beggs et al. | 180/169 |
| 5,170,352 | 12/1992 | McTamaney et al. | 364/424.02 |
| 5,377,106 | 12/1994 | Drunk et al. | 364/424.02 |
| 5,386,285 | 1/1995 | Asayama | 356/1 |
| 5,471,214 | 11/1995 | Faibish et al. | 342/70 |
| 5,475,494 | 12/1995 | Nishida et al. | 356/4.01 |
| 5,477,929 | 12/1995 | Waffler et al. | 364/461 |
| 5,587,929 | 12/1996 | League et al. | 364/516 |
| 5,612,883 | 3/1997 | Shaffer et al. | 364/460 |
| 5,633,705 | 5/1997 | Asayama | 356/3.14 |
| 5,680,313 | 10/1997 | Whittaker et al. | 364/460 |
| 5,758,298 | 5/1998 | Guldner | 901/46 |
| 5,808,728 | 9/1998 | Uehara | 356/5.01 |

OTHER PUBLICATIONS

ASN # 08/432,389 filed May 1, 1995; Inventor: Whittaker, et al.

*Primary Examiner*—Stephen C. Buczinski
*Attorney, Agent, or Firm*—Steven D. Lundquist

[57] ABSTRACT

A method and apparatus is disclosed to detect an obstacle in the path of a mobile machine. The present invention scans a field of interest by each of a plurality of obstacle sensor systems, weights the scanned data received from the obstacle sensor systems, and determines at least one characteristic of the obstacle as a function of the weighted scanned data.

24 Claims, 6 Drawing Sheets

Fig_5_
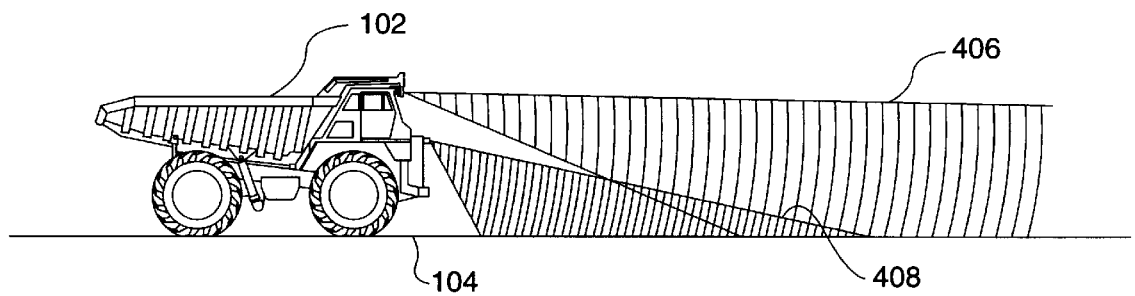
Fig_6_
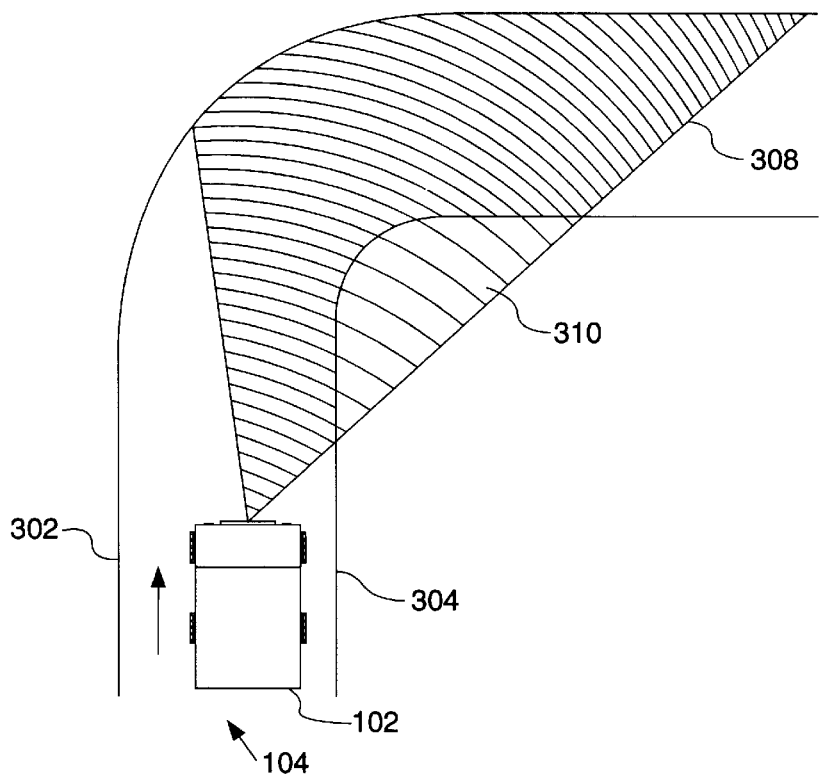

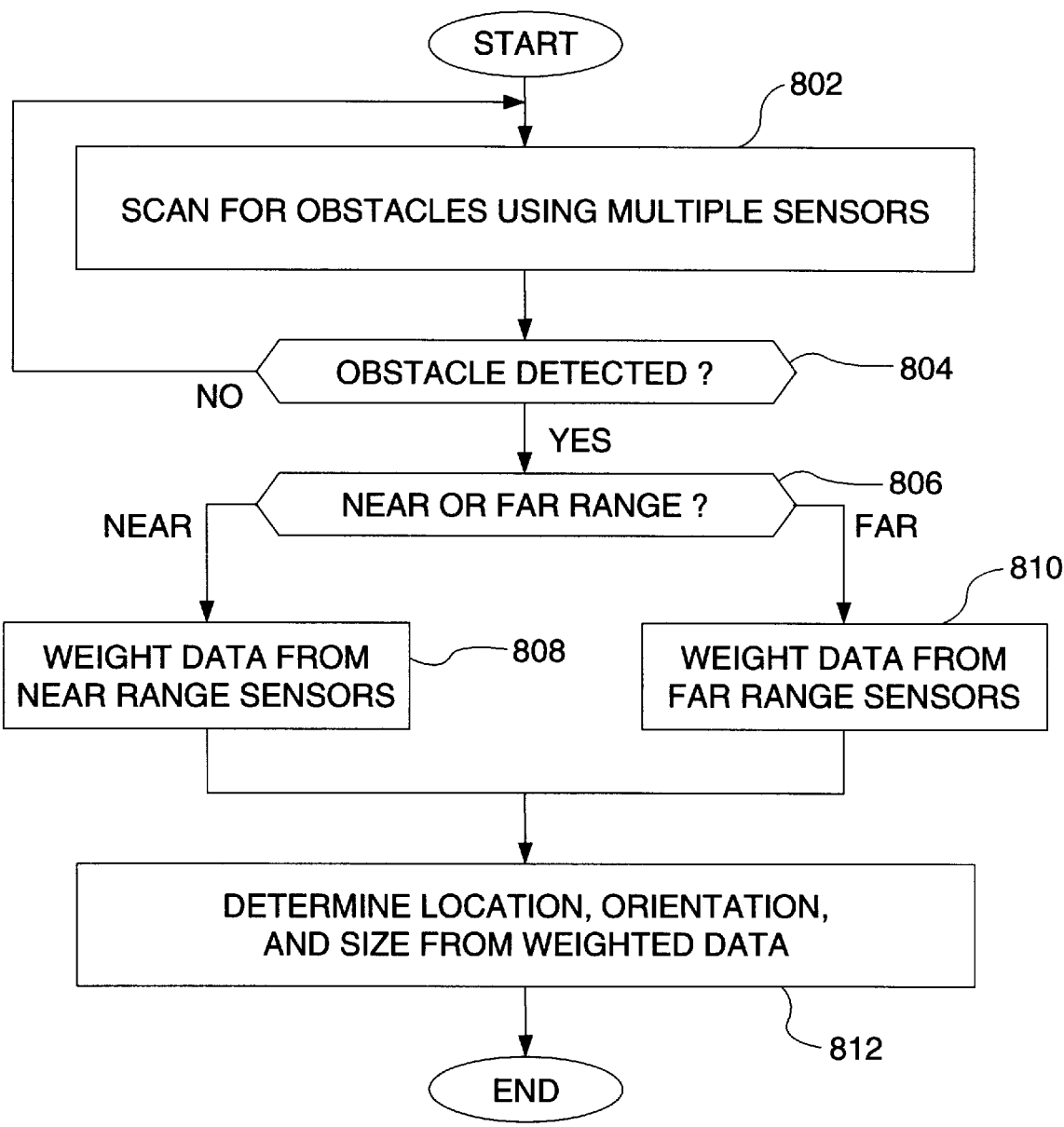

METHOD AND APPARATUS FOR DETECTING OBSTACLES USING MULTIPLE SENSORS FOR RANGE SELECTIVE DETECTION

TECHNICAL FIELD

This invention relates generally to a method and apparatus for detecting obstacles by a mobile machine and, more particularly, to a method and apparatus for detecting obstacles using at least one of a near and far range obstacle sensor system.

BACKGROUND ART

Mobile machines are used to perform a variety of tasks. As an example, in an earthworking environment such as a mining site, mobile machines, e.g., off-road mining trucks, haul material throughout the site.

For repetitive tasks such as above, it is becoming advantageous and desirable to operate the mobile machines autonomously. The environment in which the trucks operate may be harsh, and more efficient operations may be attained if the human fatigue factor is eliminated.

As an example of using off-road mining trucks autonomously, U.S. Pat. No. 5,612,883, issued to Shaffer et al., provides an exemplary disclosure of a system for autonomous operations of mobile machines. In this patent, Shaffer et al. discloses a fleet of off-road mining trucks operating autonomously at a mining site. Parameters such as position determination, navigation, path planning, and machine control are performed without the aid of human operators.

An important factor in enabling a mobile machine to operate autonomously is the ability to detect obstacles in the machine's path of travel, and to respond in an acceptable manner when obstacles are detected. In the above example, Shaffer et al. teaches a system and method for detecting obstacles in the path of a mobile machine.

However, obstacle detection systems must operate under complex and constantly changing environments. In the autonomous, off-road mining truck example described by Shaffer et al., the trucks must navigate winding and curving roads under harsh environmental conditions. Frequently, normal obstacle detection procedures are interrupted by the need to maneuver around previously detected obstacles, thus requiring the truck to be able to detect obstacles at close range in confined areas. Under these changing conditions, no single obstacle detection system can provide optimal results at all times.

Attempts have been made to combine various obstacle sensors into a packaged obstacle detection system. For example, in U.S. Pat. No. 5,170,352, McTamaney et al. discloses an obstacle detection system using touch sensors, infrared sensors, ultrasonic sensors, laser sensors, and vision sensors. This variety of sensors provide redundant operation as an autonomous vehicle moves about. However, the various sensors, by the nature of their individual characteristics, will differ in their interpretations of the obstacle being detected. For example, an infrared sensor and an ultrasonic sensor may detect the same obstacle, but information such as location, size, and shape of the obstacle may differ widely between the two sensors. Some of these differences may be attributed to external factors such as ambient light and the angle of detection. A method and system is needed to compensate for the differences in the characteristics of the sensors and the various external factors, and to evaluate the data received from each sensor to determine the presence of an obstacle in an optimal manner.

The present invention is directed to overcoming one or more of the problems as set forth above.

DISCLOSURE OF THE INVENTION

In one aspect of the present invention a method for detecting an obstacle in the path of a mobile machine is disclosed. The method includes the steps of scanning by each of a plurality of obstacle sensor systems, weighting the scanned data received from the obstacle sensor systems, and determining at least one characteristic of the obstacle as a function of the weighted scanned data.

In another aspect of the present invention an apparatus for detecting an obstacle in the path of a mobile machine is disclosed. The apparatus includes a plurality of obstacle sensor systems, means for determining at least one parameter, and a control system. The control system is adapted for receiving a signal having scanned data from each obstacle sensor system, weighting the scanned data, and determining at least one characteristic of the obstacle as a function of the weighted scanned data.

BRIEF DESCRIPTION OF THE DRAWINGS

FIG. 5 is a side view of an aspect of the present invention using near and far range sensors;

FIG. 6 is a diagrammatic illustration of an application of the present invention on a curved path;

FIG. 8 is a flow diagram of an aspect of the present invention.

BEST MODE FOR CARRYING OUT THE INVENTION

The present invention is, in the preferred embodiment, a method and apparatus for detecting an obstacle by a mobile machine at a work site and, as an example, is described below with reference to a fleet of mobile machines at an earthworking site, such as an open pit mining site. However, other work sites, e.g., a warehouse, a logging site, a construction site, and the like, may benefit from application of the present invention.

Figure 1:
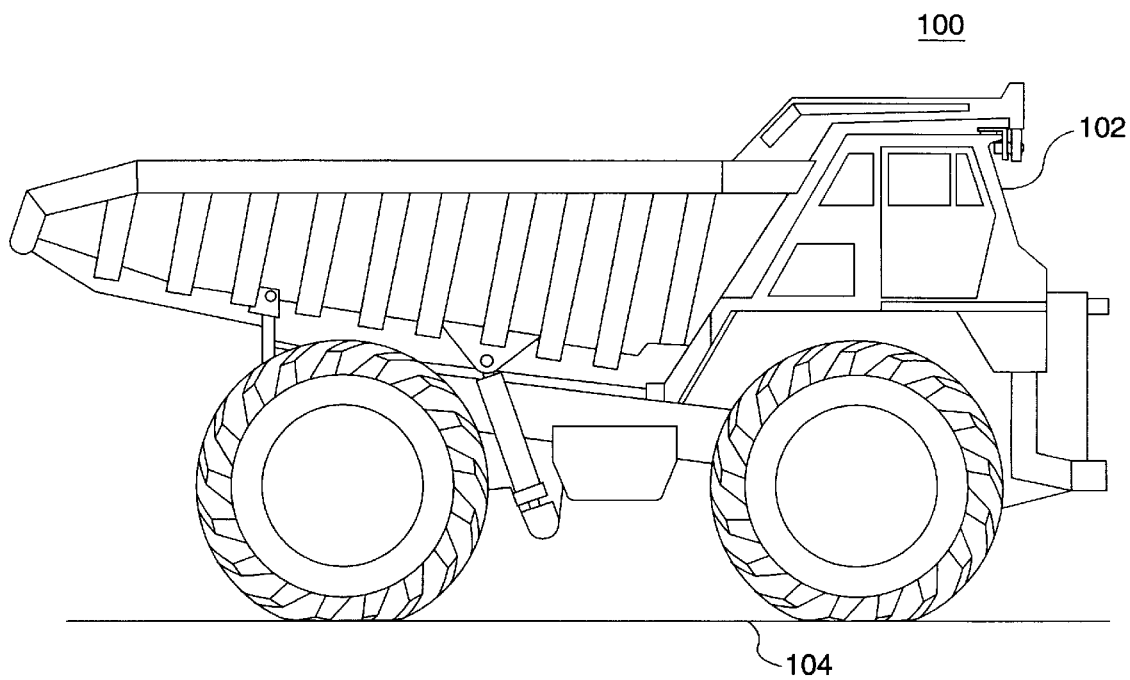
FIG. 1 is a diagrammatic illustration of a mobile machine shown as an off-road mining truck.

Referring to the drawings and, in particular, to FIG. 1, a mobile machine 102 is shown. The mobile machine 102 of FIG. 1 is depicted as an off-road mining truck, which travels on a path 104 at a mining site. Fleets of off-road mining trucks are used extensively at open pit mining sites to haul materials throughout the site. Recent developments in technology allow fleets of mining trucks to operate autonomously, thus freeing human operators from working long shifts in harsh environments.

A major concern in operating mobile machines autonomously is the ability to detect obstacles in the path of the mobile machine 102 accurately, in a harsh and constantly changing environment. Examples of obstacles include rocks and boulders, and other mobile machines that traverse the same path.

Although the mobile machine 102 in FIG. 1 is shown as an off-road mining truck, other types of mobile machines may use the present invention. Examples of mobile machines include fork lift trucks, logging trucks, wheel loaders, track-type tractors, and the like.

Figure 2:
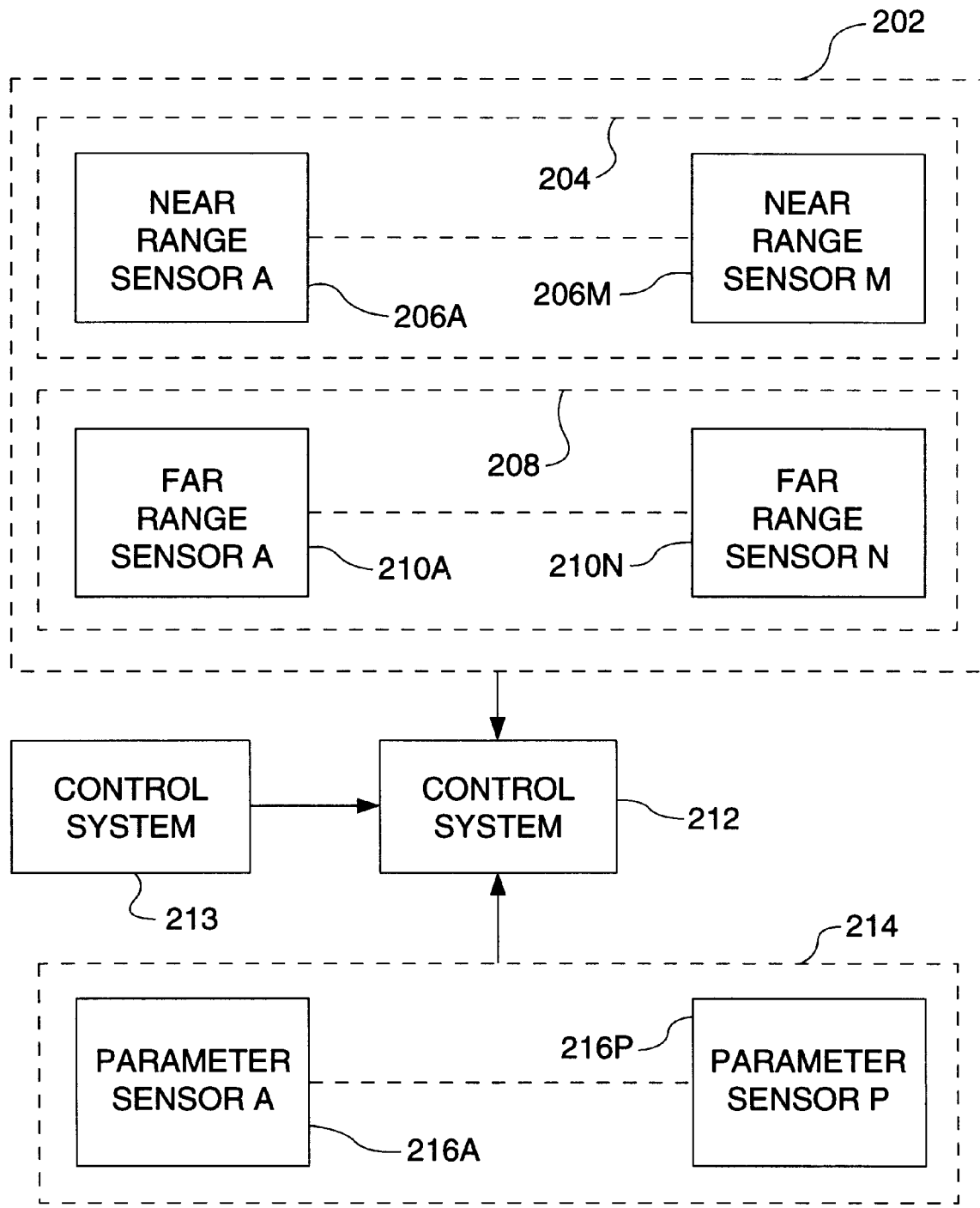
FIG. 2 is a block diagram illustrating an aspect of the present invention.

Referring to FIG. 2, an obstacle detection system 202 is located on the mobile machine 102. The obstacle detection system 202 includes a near range obstacle sensor system 204 and a far range obstacle sensor system 208. The near range obstacle sensor system 204 includes at least one near range obstacle sensor 206A–206M. The far range obstacle sensor system 208 includes at least one far range obstacle sensor 210A–210N.

An obstacle sensor is designated as near range or far range in response to the obstacle sensor being configured to detect obstacles at less than a predetermined distance, i.e., near range, or greater than a predetermined distance, i.e., far range. The obstacle sensor may use a technology that is more effective for either near range or far range use. Examples of obstacle sensor technologies that may be used is described below. Alternatively, obstacle sensors of the same technology may be configured differently on the mobile machine 102 to enable more efficient use in either near range or far range environments. For example, two obstacle sensors of the same type may be mounted on a mobile machine 102 such that a first sensor scans a predetermined far range and a second sensor scans a predetermined near range.

Examples of typical obstacle sensors include, but are not limited to, radar scanners, sonar scanners, laser scanners, optical scanners, and infrared scanners. Each type of obstacle sensor has unique characteristics that provide advantages over other types of obstacle sensors. For example, sonar and optical scanners provide good near range obstacle detection abilities. However, optical scanners are sensitive to the amount of ambient light available, and the effectiveness of sonar scanners is dependent on the composition of the material being scanned.

Radar scanners are often used as obstacle sensors. A radar scanner may, as an example, be configured for far range scanning as a forward looking scanner. A forward looking radar scanner of this type may not perform well for near range scanning, due to excessive signal noise at near range. However, a radar scanner may function well as a near range scanner, when configured as a Doppler radar.

Laser scanners may be configured as near or far range obstacle sensors, dependent upon the scanning pattern set up on the mobile machine 102.

Other types of obstacle sensor technologies may be used in the preferred embodiment of the present invention. In addition, any of the above described obstacle sensors may be used for near range sensing and far range sensing by configuring the sensor for respective near and far range use on the mobile machine 102.

The obstacle detection system 202 receives sensed data from the near and far range obstacle sensors 20GA–206M, 210A–210N and delivers a signal to a control system 212. The control system 212 processes the signal as described below with respect to the present invention, and determines characteristics, such as the location, orientation, and size, of any detected obstacle.

A parameter sensor system 214, shown in FIG. 2, includes at least one parameter sensor 21GA–216P. A parameter is a condition that affects the accuracy of at least one obstacle sensor and may be sensed directly or derived from other methods.

An example of a parameter is the amount of ambient light that is present. The amount of ambient light determines the accuracy of an optical sensor. Low light conditions, e.g., night, dusk, fog, dust, and underground operations, reduce the ability of an optical sensor to detect obstacles. Ambient light can be sensed directly, or can be determined by knowledge of the time of day or the mode of operation, e.g., above ground or underground.

Another example of a parameter is the relative size of an obstacle that is detected. A small object may not be detected effectively by some types of sensors, e.g., sonar and infrared, but may be easily detected by other types of sensors, e.g., laser and optical. As the various sensors detect an object, the relative approximate size of the object can be determined, which can be used to determine which obstacle sensors may be more accurate in determining more precise characteristics of the object.

Yet another example of a parameter is the amount of reflected power that is returned from an object that is scanned. Objects reflect varying amounts of power as a function of the shape and composition of the object. For example, a large rock will reflect less power back to an obstacle sensor than a smooth metallic object, such as a truck. Monitoring the relative amount of reflected power can help determine which obstacle sensors are better suited to scan the obstacle that has been detected. For example, an optical or infrared scanner may be more effective to scan an irregularly shaped object that has low reflectivity than a radar or laser scanner.

The parameters described above are exemplary of conditions that affect obstacle sensors. Other parameters may exist which further affect the operations of one or more obstacle sensors, and may be monitored accordingly in the present invention.

With reference to FIGS. 3–7, illustrative embodiments of applications of the present invention are shown.

Figure 3:
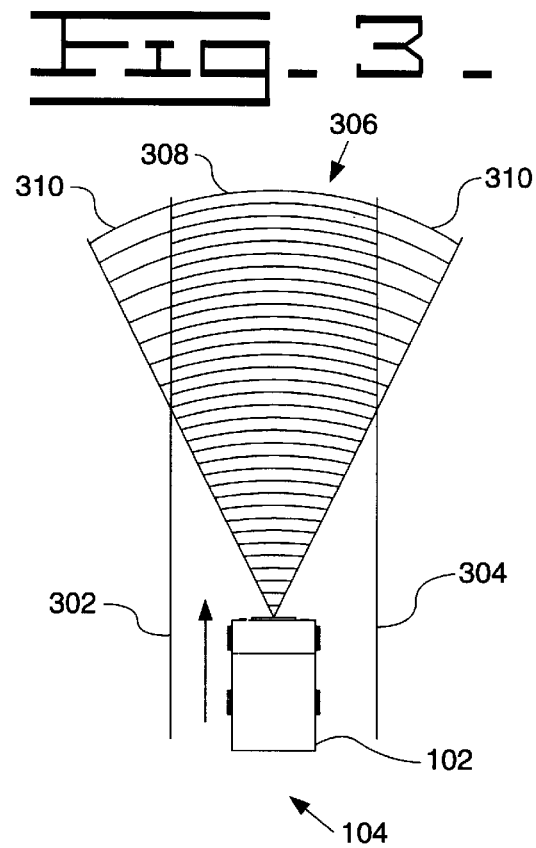
FIG. 3 is a diagrammatic illustration of an application of the present invention on a straight path.

With particular reference to FIG. 3, a mobile machine 102 is shown traversing a path 104. The section of path 104 shown is straight, i.e., the path 104 does not curve to the right or the left. The path 104 is shown with a first side and a second side. The first side is depicted in FIG. 3 as a left side 302 from the perspective of a driver of the mobile machine 102. The second side is shown as a right side 304 of the path 104.

A scan pattern of an obstacle sensor is shown covering a field of interest 306. For ease of understanding, only one scan pattern is shown. However, it is understood that the mobile machine 102 may be configured with a plurality of obstacle scanners, each with a distinct scan pattern.

The scan pattern, as shown, scans areas outside the boundaries of the left and right sides 302,304 of the path 104 in addition to scanning the path 104 in front of the mobile machine 102. The area scanned on the path 104 is a zone of interest 308. The areas scanned to the left and the right of the path 104 are outside the zone of interest and are defined as external zones 310.

It is known in the art that autonomous mobile machines frequently have, in a database 213, a terrain map of the work site for navigation purposes. The boundaries of paths, roads, and major landmarks are known to the mobile machine. Using this knowledge in the example application of FIG. 3, the mobile machine 102 is aware of the location of the left side 302 and the right side 304 of the path 104, as well as the mobile machine's location on the path 104. Using this knowledge, the mobile machine 102 may disregard any obstacle located in the external zones 310, thus focusing on any obstacle found in the zone of interest 308.

Figure 4:
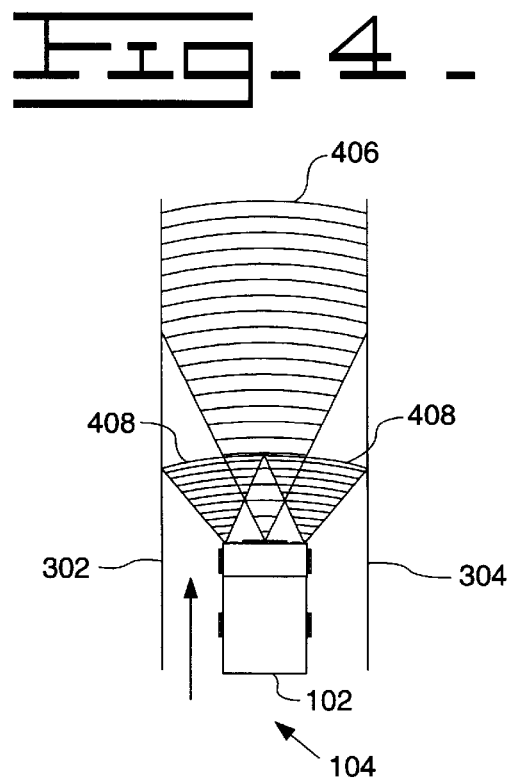
FIG. 4 is a diagrammatic illustration of an aspect of the present invention using near range and far range sensors.

Referring now to FIG. 4, the mobile machine 102 is shown on a section of path 104 that is straight. In FIG. 4, a scan pattern of a far range obstacle sensor 210A–210N is shown in a far range zone of interest 406. Additionally, scan patterns of near range obstacle sensors 206A–206M are shown in near range zones of interest 408. As shown in FIG. 4, the scan patterns in the near range zones of interest 408 scan in areas that are not covered by the scan pattern in the far range zone of interest 406, and thus provide a more complete scan of the path 104 in front of the mobile machine 102. Additionally, the scan patterns in the near range zones of interest 408 and the scan pattern in the far range zone of interest 406 may be configured to overlap, thus providing scan coverage in certain desired areas by near and far range sensors.

Referring now to FIG. 5, a side view of the embodiment of FIG. 4 is shown. In FIG. 5, the scan patterns in the near range zones of interest are shown scanning the path 104 directly in front of the mobile machine 102. From FIGS. 4 and 5, it is apparent that the scan patterns of near range obstacle sensors 206A–206M can detect the presence of obstacles in close proximity to the mobile machine 102, while the scan pattern of the far range obstacle sensor 210A–210N can detect the presence of obstacles further away on the path 104.

Referring now to FIG. 6, a mobile machine 102 is shown traversing a path 104 that curves to the right. As shown, part of the zone of interest 308 is around the curve of the path 104 from the mobile machine 102. The scan pattern passes through an external zone 310 before returning to the zone of interest 308. In this application, it is desired to know if any obstacles exist around the curved portion of the road. Thus, as the mobile machine 102 travels around the curve, any obstacle encountered will already be scanned by the mobile machine 102, and appropriate action can be taken in time.

However, the external zone may contain objects that could be scanned as obstacles by the mobile machine 102. Therefore, the mobile machine 102 must, from knowledge of the terrain map of the work site, disregard any objects detected as the scan moves through the external zone 310, and consider any objects detected as the scan re-enters the zone of interest 308.

Figure 7:
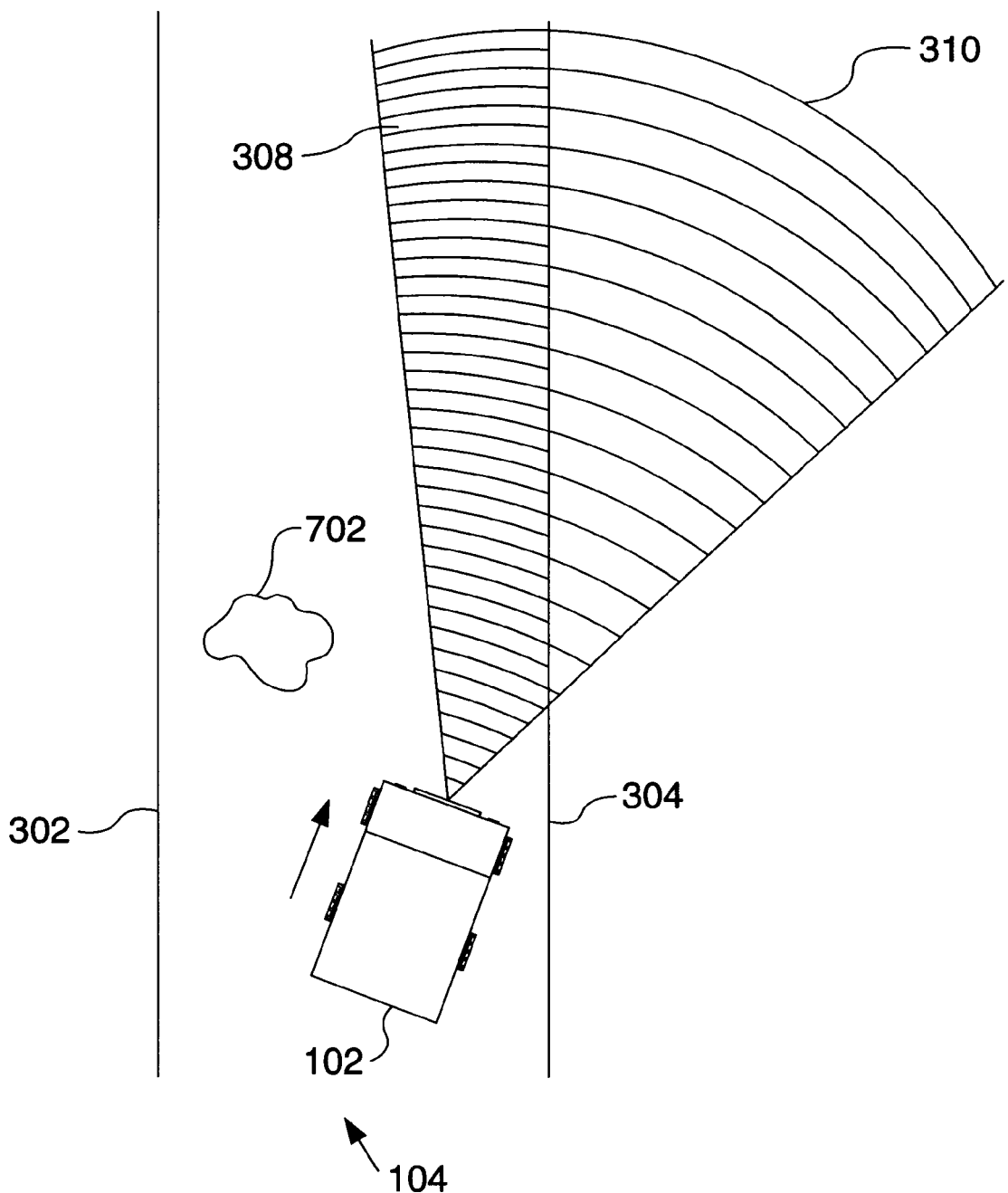
FIG. 7 is a diagrammatic illustration of an application of the present invention as a mobile machine travels around an obstacle.

With reference to FIG. 7, an embodiment of the present invention is shown where the mobile machine 102 has detected an obstacle 702 in the path 104. The mobile machine 102 is shown traveling around the obstacle 702 on an alternate path determined by the mobile machine 102. During this maneuver, the obstacle detection system 202 of the mobile machine 102 is repositioned from facing along the length of the path 104, as shown in FIG. 3, to facing the side of the path 104. During this change of position, the zone of interest 308 and the external zone 310 change substantially. The mobile machine 102 must, as it travels around the obstacle 702, continually adjust the zone of interest 308 to avoid detecting false obstacles beyond the side of the path 104.

A preferred embodiment of a method of the present invention is illustrated in the flow diagram of FIG. 8.

In a first control block 802, the obstacle detection system 202 scans for obstacles using a plurality of sensors, as described above. Each near range and far range obstacle sensor 206A–206M,210A–210N is configured to scan a field of interest 306.

In a first decision block 804, a determination is made whether an obstacle is detected. If no obstacle is detected, the system continues to scan for obstacles. If an obstacle is detected, control proceeds to a second decision block 806.

In the second decision block 806, the detected obstacle is determined to be in a predetermined near range, or a predetermined far range. If the obstacle is determined to be in a near range, control moves to a second control block 808, where data from the near range obstacle sensors 206A–206M is weighted. If the obstacle is determined to be in a far range, control moves to a third control block 810, where data from the far range obstacle sensors 210A–210N is weighted. If the obstacle is detected in a scan area that is scanned by both near and far range obstacle sensors, then, in a preferred embodiment, the data from both the near and far range obstacle sensors is weighted.

The weighting factors are determined as a function of the external parameters, as described above. For example, if it is determined that ambient light levels are low, then obstacle sensors which depend on ambient light, e.g., optical sensors, are assigned a weight that is low. In an exemplary 0 to 1 weight scale, the weight for an optical sensor under low ambient light conditions would approach 0.

In the preferred embodiment, the weights that are used are determined empirically, and can be altered as conditions warrant.

Control then proceeds from either the second control block 808 or the third control block 810 to a fourth control block 812. In the fourth control block 812, at least one characteristic of the detected obstacle is determined as a function of the weighted scanned data. Examples of characteristics of obstacles include the location, orientation, and size of the obstacle. Other characteristics could be determined as a function of the present invention.

Several methods could be used to determine the characteristics of the obstacle from the weighted scanned data. For example, the control system 212 could calculate an average of the weighted scanned data. The weighted scanned data that is averaged may include a combination of location, orientation, and velocity data, or may include data indicating a probability of existence of the detected obstacle. As another example, the weighted scanned data could be summed, then the sum divided by the sum of the weight values used to weigh the scanned data. As still another example, the weight values could be averaged to determine an overall probability of existence, then the overall probability value could be used to weight the data from each obstacle sensor. Other methods could be employed without deviating from the spirit of the invention.

Industrial Applicability

In an example of an application of the present invention, a fleet of off-road mining trucks travel over roads throughout a mining site, hauling loads of material and performing other tasks. The mining site is typically in a harsh environment and the roads at the mining site are constantly changing due to the changing nature of the mining areas.

Quite often, conditions arise which introduce obstacles on the mining roads. For example, rocks and boulders may roll or slide down hillsides onto the roads, materials may spill out of the trucks, and trucks may break down and block the roads.

Operators of these trucks constantly monitor the roads for obstacles and respond as needed by either stopping or driving around the obstacle.

However, autonomous trucks are being developed to remove human operators from these harsh, fatiguing environments. Consequently, some means is required to monitor the roads for obstacles and respond appropriately in an autonomous manner. The preferred embodiment of the present invention allows for an autonomous fleet of mining trucks to monitor for obstacles by employing a variety of obstacle detection techniques, and determine the presence of an obstacle by analyzing the data received from a plurality of obstacle sensors to determine the most probable characteristics of the detected obstacle.

Other aspects, objects, and features of the present invention can be obtained from a study of the drawings, the disclosure, and the appended claims.

I claim:

1. A method for detecting an obstacle in the path of a mobile machine, including the steps of:
   scanning a field of interest by each of a plurality of obstacle sensor systems;
   determining a zone of interest from each field of interest as a function of a terrain map database located on the mobile machine;
   weighting the scanned data received from the obstacle sensor systems as a function of at least one parameter; and
   determining at least one characteristic of the obstacle as a function of the weighted scanned data.

2. A method, as set forth in claim 1, wherein an object detected outside the zone of interest is determined to be outside the path of the mobile machine.

3. A method, as set forth in claim 1, including the step of determining the range to the obstacle as being one of a near range and a far range.

4. A method, as set forth in claim 3, wherein the scanned data from a first set of obstacle sensor systems is weighted in response to determining the range to the obstacle as being a near range.

5. A method, as set forth in claim 3, wherein the scanned data from a second set of obstacle sensor systems is weighted in response to determining the range to the obstacle as being a far range.

6. A method, as set forth in claim 1, wherein each of the plurality of obstacle sensor systems is configured to scan a predetermined portion of the field of interest.

7. A method, as set forth in claim 1, wherein each of the plurality of obstacle sensor systems is configured to scan the field of interest with a sensor having characteristics unique to each other of the plurality of obstacle sensor systems.

8. A method, as set forth in claim 1, wherein each of the plurality of obstacle sensor systems is configured to scan at least one of a predetermined portion of the field of interest and the field of interest with a sensor having characteristics unique to each other of the plurality of obstacle sensor systems.

9. A method, as set forth in claim 1, wherein the at least one parameter includes an amount of ambient light available.

10. A method, as set forth in claim 1, wherein the at least one parameter includes a size of the obstacle.

11. A method, as set forth in claim 1, wherein the at least one parameter includes an amount of reflected power received by at least one of the plurality of obstacle sensor systems, the reflected power being a function of a shape and a composition of the obstacle.

12. A method, as set forth in claim 1, wherein weighting the scanned data is performed using empirically obtained values of weights.

13. A method, as set forth in claim 1, wherein determining at least one characteristic of the obstacle includes the step of calculating an average of the weighted scanned data.

14. A method, as set forth in claim 1, wherein determining at least one characteristic of the obstacle includes the steps of:
   weighting the scanned data received from each of the obstacle sensor systems as a function of a respective at least one parameter;
   summing the weighted scanned data; and
   dividing the summed scanned data by the sum of a plurality of weight values used to weight the scanned data.

15. A method, as set forth in claim 1, wherein the at least one characteristic of the obstacle is a probability of existence of the obstacle.

16. A method, as set forth in claim 1, wherein the at least one characteristic of the obstacle is a location of the obstacle.

17. A method, as set forth in claim 1, wherein the at least one characteristic of the obstacle is an orientation of the obstacle.

18. A method, as set forth in claim 1, wherein the at least one characteristic of the obstacle is a size of the obstacle.

19. An apparatus for detecting an obstacle in the path of a mobile machine, comprising:
   an obstacle detection system located on the mobile machine, the obstacle detection system including a plurality of obstacle sensor systems;
   a terrain map database located on the mobile machine;
   means located on the mobile machine for determining at least one parameter; and
   a control system located on the mobile machine for receiving a signal having scanned data from each of the plurality of obstacle sensor systems, weighting the scanned data from each obstacle sensor system as a function of the at least one parameter, and determining at least one characteristic of the obstacle as a function of the weighted scanned data, the control system being further adapted for determining a zone of interest as a function of the terrain map database, the zone of interest being determined from the field of interest.

20. An apparatus, as set forth in claim 19, wherein each of the plurality of obstacle sensor systems is configured to scan a predetermined portion of a field of interest, and wherein an object detected outside the zone of interest is determined to be outside the path of the mobile machine.

21. An apparatus, as set forth in claim 19, wherein the at least one characteristic of the obstacle is a probability of existence of the obstacle.

22. An apparatus, as set forth in claim 19, wherein the at least one characteristic of the obstacle is a location of the obstacle.

23. An apparatus, as set forth in claim 19, wherein the at least one characteristic of the obstacle is an orientation of the obstacle.

24. An apparatus, as set forth in claim 19, wherein the at least one characteristic of the obstacle is a size of the obstacle.

* * * * *